US012638646B2

(12) United States Patent
Mills et al.

(10) Patent No.: US 12,638,646 B2
(45) Date of Patent: May 26, 2026

(54) NESTABLE ENCLOSURE KIT AND ENCLOSURE ASSEMBLY FOR TELECOMMUNICATION CABLE

(71) Applicant: Plugin Optics Inc., Plantation, FL (US)

(72) Inventors: David M. Mills, Bremen, GA (US); Patrick M. Williams, Plantation, FL (US)

(73) Assignee: Plugin Optics Inc., Plantation, FL (US)

( * ) Notice: Subject to any disclaimer, the term of this patent is extended or adjusted under 35 U.S.C. 154(b) by 444 days.

(21) Appl. No.: 18/302,316

(22) Filed: Apr. 18, 2023

(65) Prior Publication Data

US 2024/0353642 A1 Oct. 24, 2024

(51) Int. Cl.
*G02B 6/44* (2006.01)

(52) U.S. Cl.
CPC ......... *G02B 6/4442* (2013.01); *G02B 6/4446* (2013.01); *G02B 6/4452* (2013.01)

(58) Field of Classification Search
CPC ... G02B 6/4442; G02B 6/4446; G02B 6/4452
USPC ........................................................ 385/135
See application file for complete search history.

(56) References Cited

U.S. PATENT DOCUMENTS

| | | | |
|---|---|---|---|
| 5,553,186 A | 9/1996 | Allen | |
| 5,793,921 A | 8/1998 | Wilkins et al. | |
| 8,220,298 B2 | 7/2012 | Burke et al. | |
| 2002/0146229 A1* | 10/2002 | Roberts ............... | G02B 6/4444 |
| | | | 385/135 |
| 2006/0254794 A1* | 11/2006 | Burke .................. | H02G 3/0493 |
| | | | 174/38 |
| 2007/0183732 A1 | 8/2007 | Wittmeier et al. | |
| 2018/0156595 A1* | 6/2018 | Kay ......................... | G02B 7/14 |
| 2018/0156997 A1* | 6/2018 | Holmberg ............ | G02B 6/4453 |
| 2022/0342158 A1* | 10/2022 | James .................. | G02B 6/3616 |
| 2024/0209731 A1* | 6/2024 | Kiddy .................. | G02B 6/2551 |

* cited by examiner

*Primary Examiner* — Jerry M Blevins
(74) *Attorney, Agent, or Firm* — Thomas E. Lees, LLC

(57) ABSTRACT

An enclosure kit for telecommunication cable, a method of making an enclosure kit for telecommunication cable, a method of storing a plurality of bases and pedestals and an enclosure assembly for telecommunication cable. By providing a tapered, generally how construction to both a ground-engaging base and an upward-extending pedestal, a telecommunication cable assembly may be formed, along with one or more locking features. Furthermore, by providing the tapered, generally how construction to both the base and the pedestal, groups of each may be nested in volumetrically-efficient packaging for shipping and storing. The size of the base may be made common to pedestals of numerous different sizes, thereby further simplifying packaging and shipping.

15 Claims, 8 Drawing Sheets

NESTABLE ENCLOSURE KIT AND ENCLOSURE ASSEMBLY FOR TELECOMMUNICATION CABLE

TECHNICAL FIELD

The present disclosure generally relates to an above-ground enclosure for use in housing telecommunication cable, and more particularly to an enclosure made up of separate components including a pedestal and base each of which may be packaged and shipped as a nestable kit with like components such that one of each of the separate components may be combined with one another at a point of use to form a telecommunication cable enclosure assembly.

BACKGROUND

Above-ground pedestal-style enclosures such as those used to contain telecommunication cable (that is, for telephone, television, broadband and associated service lines, particularly fiber-optic variants) include a lid that is separately attachable to a base. Upon installation at its point of use, the enclosure typically occupies up to about one foot of horizontal length and between two and three feet of vertical height. Because the two major components (specifically, the base and lid) are of generally hollow construction, there is a significant amount of internal space within both that neither contributes to their structural or functional attributes nor provides a volumetrically-efficient profile with which to facilitate storing or shipping them in large quantities from their point of manufacture to their remote point of use. With such construction, the cost of such storage and shipping can be formidable.

SUMMARY

Accordingly, the authors of the present disclosure have discovered an enclosure that as a kit can provide ease of shipping and assembly.

In one aspect, an enclosure kit for telecommunication cable includes numerous bases each of which has a tapered hollow shape about an axis that extends the height-wise dimension of the base, as well as a numerous pedestals each of which has a tapered hollow shape about an axis that extends along the height-wise dimension of the pedestal. Individual ones of the base and pedestal make up separate components (for example, first and second components) that when joined to one another along a common axis make up a nested collinear cooperative engagement with one another within an enclosure assembly. Relatedly, numerous bases of the same size and shape placed in a nested (that is to say, stacked) combination make up a base portion of the enclosure kit, while numerous pedestals of the same size and shape may similarly be placed in nested combination to make up a pedestal portion of the enclosure kit.

In another aspect, a method of making components of an enclosure kit for telecommunication cable includes forming numerous bases and numerous pedestals. Each base has a tapered hollow shape about a first axis that extends along the height-wise dimension of the base while each pedestal has a tapered hollow shape about a second axis that extends along the height-wise dimension of the pedestal. In particular, each base from a base portion of the enclosure kit is sized and shaped to provide cooperative engagement with a corresponding pedestal from a pedestal portion of the enclosure kit. In this way, and upon a subsequent formation of a point-of-use assembly through such cooperative engagement, the first axis and the second axis of each base and pedestal pair define a nested collinear cooperative engagement with one another. Moreover, prior to such formation of the point-of-use assembly from the base and pedestal pair, each of the bases within the base portion of the enclosure kit are configured to fit with one another through a nested combination with a plurality of other identical bases (that is to say, of similar size and shape) while each of the pedestals within the pedestal portion of the enclosure kit are configured to fit with one another through a nested combination with a plurality of other identically sized and shaped pedestals.

In yet another aspect, a method of storing an enclosure kit for telecommunication cable includes receiving numerous bases and arranging them into a nested combination with other identical bases, receiving numerous pedestals and arranging them into a nested combination with other identical pedestals. Each of the bases and pedestals have a tapered hollow shape about an axis that extends along their respective height-wise dimension.

In still another aspect, an enclosure assembly for telecommunication cable includes a base and a pedestal each having a tapered hollow shape about an axis that extends along a height-wise dimension. The base and the pedestal that make up the enclosure assembly are selected from respective first and second portions of an enclosure kit that where the first portion contains a nested combination of the base with numerous other identical bases and the second portion contains a nested combination of the pedestal with numerous other identical pedestals. When formed into the assembly, the base and the pedestal are in nested cooperative engagement with one another along their respective axes to form a collinear axis.

These and additional features provided by the embodiments described herein will be more fully understood in view of the following detailed description, in conjunction with the accompanying drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The authors of the present disclosure have discovered that by providing the generally hollow base and pedestal of a telecommunication cable enclosure with tapered features, significant improvements in storing and shipping efficiency can be realized without sacrificing the structural, electrical, security or aesthetic qualities of the enclosure and its use in above-ground applications for telecommunication cables in general and fiber-optical cables in particular. Within the present disclosure, it is understood that various cables and portions thereof may be housed within the telecommunication cable enclosure, including splices, connectors, storage trays (whether fixed or hinged), fiber breakout tubes, drop cable, splitters, splicing housings or any other component typically associated with telecommunication cable at various point-of-use locations and configurations such as fiber-to-the-street (FTTS), fiber-to-the curb (FTTC), fiber-to-the-home (FTTH, which is also referred to as fiber-to-the premises (FTTP)) or fiber-to-the-building (FTTB). It will be appreciated that although the enclosure assemblies and enclosure kits disclosed herein are described in conjunction with telecommunication cable in general and fiber-optic cable in particular, they may be used for other forms of wiring or cable, including for cable television lines, broadband, power lines or the like, and that all variants are deemed to be within the scope of the present disclosure.

Figure 1:
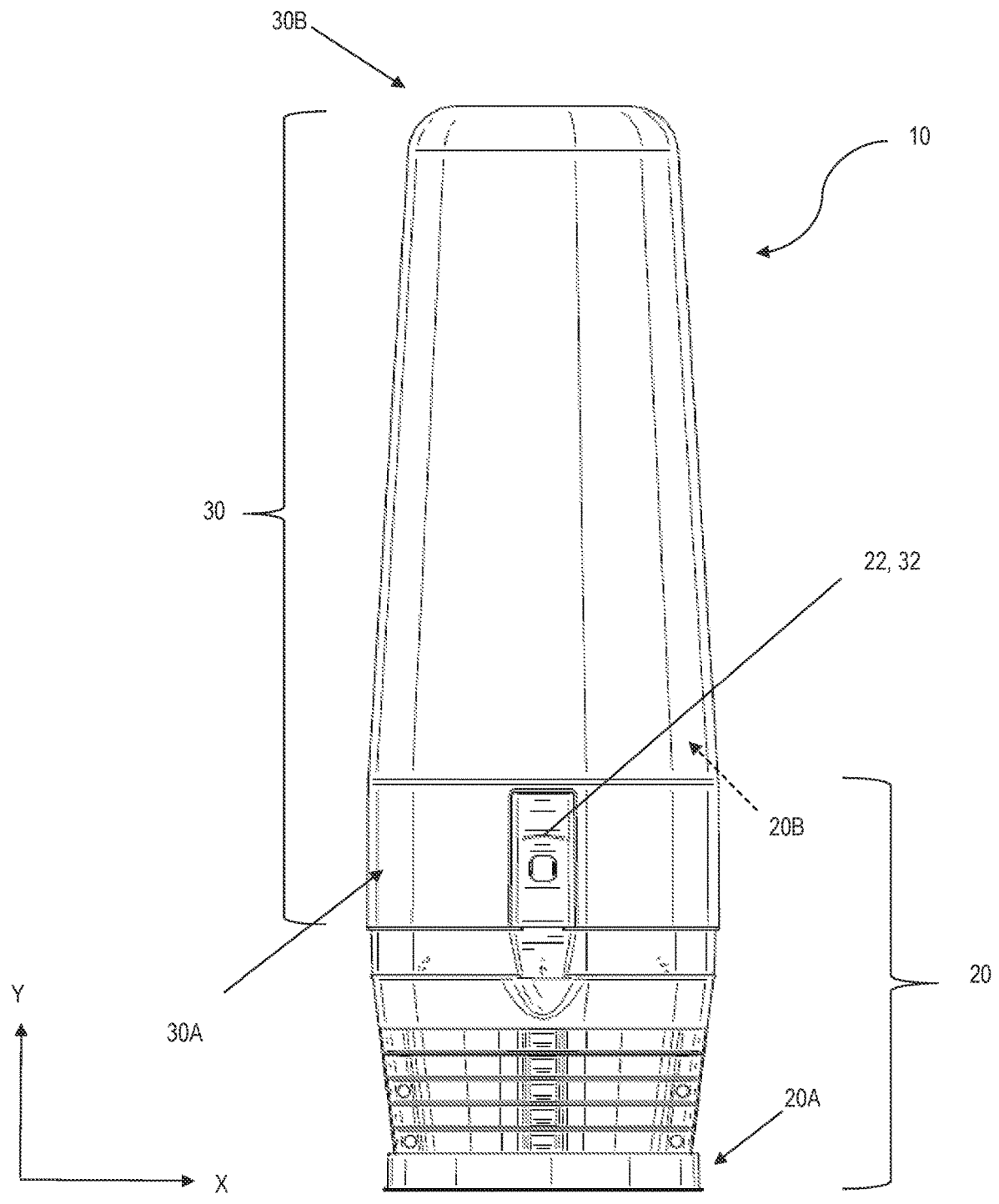
FIG. 1 depicts a telecommunication cable enclosure assembly made from a base and a pedestal according to one or more embodiments shown and described herein.

Referring first to FIG. 1, a telecommunication cable enclosure assembly 10 is shown in its as-assembled state as a pair of selectively attachable components in the form of a base 20 and a pedestal 30. Within the present disclosure, the telecommunication cable enclosure assembly 10 and its above-ground construction is distinguished from conventional below-ground boxes (also known as grade level boxes) in that there is no need in the former for a below-ground vault and its high static load-bearing capacity.

In one form, the tapered shape of the base 20 and pedestal 30 of the telecommunication cable enclosure assembly 10 corresponds to a truncated cone along at least a portion of their length along the vertical (that is, Y) axis where such truncated cone corresponds to a hollowed-out portion of a three-dimensional body of rotation of a trapezoidal shape. In this way, both of the base 20 and the pedestal 30 define external shapes with generally linear outer dimension profiles along their height-wise dimension along with internal volumes that are generally hollow. Within the present disclosure, such generally hollow construction does not necessitate that they are completely hollow, as various reinforcing or mounting structure may be included in order to provide enhancements to their moldability, structural rigidity or component connectivity. As shown, both the base 20 and pedestal 30 define a generally axisymmetric construction. As with the term "hollow", the term "axisymmetric" does not have to be complete or perfect, as it will be understood that various features may be built into one or both components in order to provide enhanced properties as will be discussed in more detail as follows. In situations where the profile of the base 20 and pedestal 30 (as well as the resulting telecommunication cable enclosure assembly 10) is generally axisymmetric in the horizontal (that is, the X-Z plane, the Y axis becomes an axis of rotation that is collinear with the height-wise dimension of both the base 20 and the pedestal 30 in their as-deployed state. Although not shown, shapes other than the generally axisymmetric ones depicted herein for the base 20, pedestal 30 and resulting telecommunication cable enclosure assembly 10 are also within the scope of the present disclosure, including those defining a generally rectangular (including square) profile when viewed in the X-Z plane. In such case, the height-wise dimension would still coincide with the Y-axis, although technically it doesn't qualify as an axis of rotation given the non-axisymmetric nature of the resulting shape. Likewise, it will be appreciated that in other forms, base 20 or pedestal 30 shapes that deviate from the generally linear taper as shown may be formed along their height-wise dimension, including those where the taper defines a slightly arcuate, curvaceous shape, as well as ones with faceted surfaces that define successively greater taper angles along the height-wise dimension, so long as the ability to achieve a high degree of nested fitting with like bases 20 or pedestals 30 is preserved.

As shown, each of the base 20 and pedestal 30 have opposing ends along their stacking direction where in particular the base 20 has a lower end 20A and an upper end 20B, while the pedestal 30 has a lower end 30A and an upper end 30B where it is understood that the use of the descriptors "upper" and "lower" semantically refer to their orientation relative to the Cartesian axis shown for the telecommunication cable enclosure assembly 10 in its as-deployed state on level ground. It will be appreciated that the upper end 20B of the base 20 is presently obscured by the lower end 30A of the pedestal 30 by virtue of their joined cooperation within the telecommunication cable enclosure assembly 10. In one non-limiting form, the diameter of each the lower end 20A of base 20 and the lower end 30A of pedestal 30 in the horizontal (that is to say, the X-Z) plane is about fourteen inches such that when joined together to form the telecommunication cable enclosure assembly 10, the outer surface of the perimeter defined by the upper end 20B of the base 20 and the inner surface of the perimeter defined by the lower end 30A of the pedestal 30 form a snug fit. In this way, the telecommunication cable enclosure assembly 10 may be substantially watertight, at least against downward-falling rain. Likewise, the height of the base 20 is about fifteen inches, while its tapered shape results in the diameter of its upper end 20B being about eleven and a half inches. While the overall height of the pedestal 30 as shown is about twenty six inches, its amount of taper may be made to vary, depending on the configuration. For example, in one form, the upper end 30B of the pedestal 30 may have a diameter of about eight inches, while in another about ten inches and in another still about twelve inches. As can be seen in both the base 20 and the pedestal 30, most of the height-wise dimension defines a tapered profile, although the relative amount of tapered versus non-tapered construction may be made to vary depending on the configuration. It will be appreciated that these shapes, sizes and degree of taper are for example only, and that other sizes (either larger or smaller), taper (either longer or shorter) and other shapes (not shown, but for example, rectangular, triangular, hexagonal, oval or other non-axisymmetric cross-sectional profiles) are also within the scope of the present disclosure.

One or both of the bases 20 and the pedestals 30 may be made from rigid, weather-resistant materials, such as polyvinyl chloride (PVC) or various polyethylene-based resins, such as high-density polyethylene (HPDE) and may be made from known manufacturing techniques such as molding in general and injection molding or transfer molding in particular. In one form one or both of the base 20 and pedestal 30 may be made as a one-piece unitary structure, while in another, at least the base 20 may be made from separate pieces in order to accommodate placement of the base 20 around legacy cables or equipment that are already in-ground. Relatedly, one or both of the base 20 and pedestal 30 may be formed to have a clamshell design where a continuous hinged portion preserves the unitary construction of the respective component while still allowing some flexibility in placing the component during installation around or over legacy equipment or components. Likewise, one or both of the base 20 and pedestal may be formed (such as through a molding process) to have locations of selective weakness (such as punchout locations or the like). In a similar manner, the materials used for the base 20 and pedestal 30 may be made from (or treated with) fire-resistant materials, as well as electrically non-conductive (including dielectric) ones.

Figure 2:
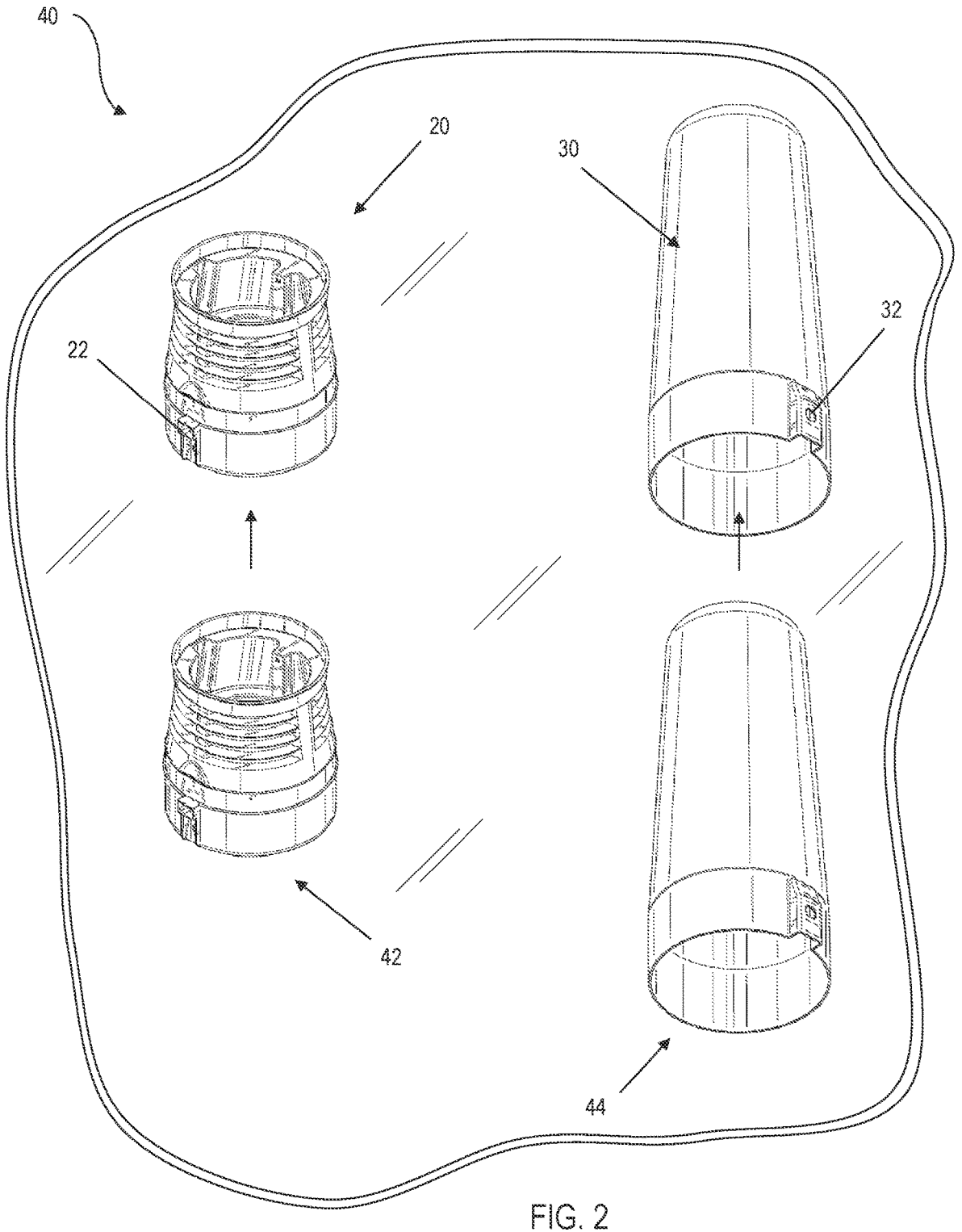
FIG. 2 depicts a telecommunication cable enclosure kit with both a first portion made up of numerous bases stacked together in a nested combination and a second portion made up of numerous pedestals stacked together in a nested combination according to one or more embodiments shown and described herein.

Referring next to FIG. 2, an entire telecommunication cable enclosure kit 40 is shown containing numerous nested bases 20 and numerous nested pedestals 30 inside a wrapped package. It will be appreciated the number of nested bases 20 and nested pedestals 30 contained within the wrapped package are shown notionally, and that greater or fewer numbers-depending on packaging, shipping, storage or other practical concerns—are within the scope of the present disclosure. Likewise, it will be appreciated that other forms of packaging may be used, depending on the storing or shipping needs of one or more of the manufacturer, transporter, warehouse operator, distributor, retailer, telecommunication cable service provider, end user or the like, and that all such variants are deemed to be within the scope of the present disclosure. Likewise, the packaging may be further segmented such that the first portion remains separate from the second portion within a common package (such as by sealing or other known approaches), or as separate packages the latter of which will be shown in FIGS. 3 and 4 that follow. Regardless of the nature of the packaging, the entire telecommunication cable enclosure kit 40 is made up of numerous bases 20 stacked together in a nested combination as part of a first portion 42, as well as numerous pedestals 30 stacked together in a nested combination as part of a second portion 44. As can be seen, by taking advantage of their tapered and generally hollow construction, the nested bases 20 and nested pedestals 30 take up far less space along the height-wise dimension for reduced vertical (Y-axis) stacking, shipping or other activities than they would if packaged separately or if not nested.

Figure 3:
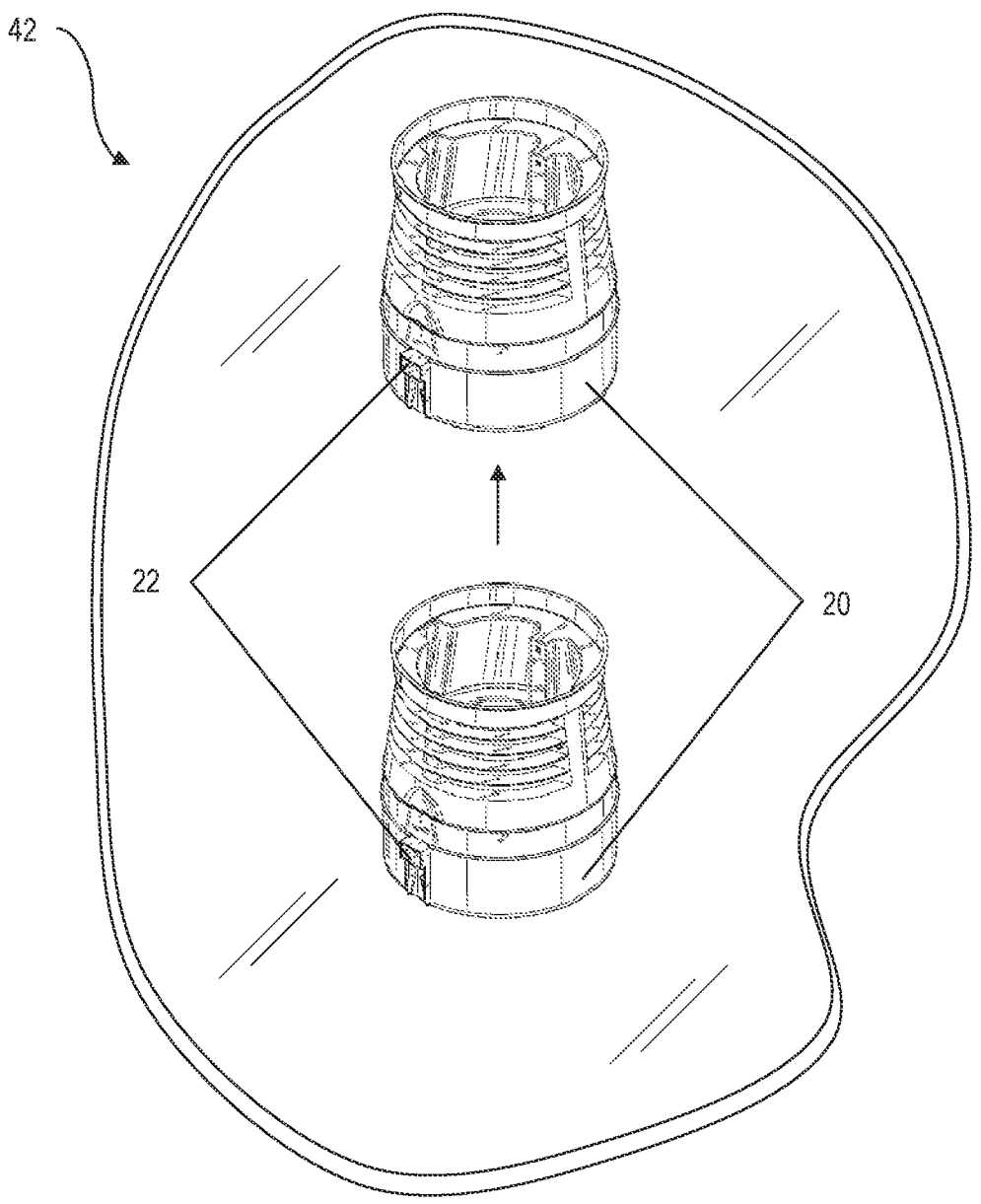
FIG. 3 depicts the first portion of the telecommunication cable enclosure kit as its own telecommunication cable enclosure kit.

Referring next to FIG. 3, a wrapped package including numerous bases 20 stacked together in a nested combination as part of the first portion 42 is shown. As with the packaging of FIG. 2, the present packaging is merely notional and may assume any form suitable for the various previously-discussed shipping or storage needs. In the manner presently shown, the first portion 42 of the entire telecommunication cable enclosure kit 40 includes only bases 20 and as such renders them isolated from the second portion 44 and the pedestals 30 contained therein, thereby becoming its own kit. In one form, even if the pedestals 30 are manufactured in large quantities such that groups thereof define different upper end 30B diameters (such as the aforementioned eight-, ten- and twelve-inch variants) associated with their degree of taper, the dimension of the corresponding lower ends 30A remains constant. In this way, the dimensions of the bases 20 may be the same regardless of which pedestal 30 a given base 20 is being mated with in order to form the telecommunication cable enclosure assembly 10. This commonality among the bases 20 promotes reduced tooling and related manufacturing costs, as well as costs associated with shipping and storage of the entire telecommunication cable enclosure kit 40. In another form, the dimensions of the bases 20 may be sized to correspond with a particular-sized pedestal 30 such that (for example an 8-inch pedestal 30 can only be coupled to a first-sized base 20, while a ten-inch pedestal 30 can only be coupled to a second-sized (that is to say, larger) base 20). Either variant is deemed to be within the scope of the present disclosure.

Figure 4:
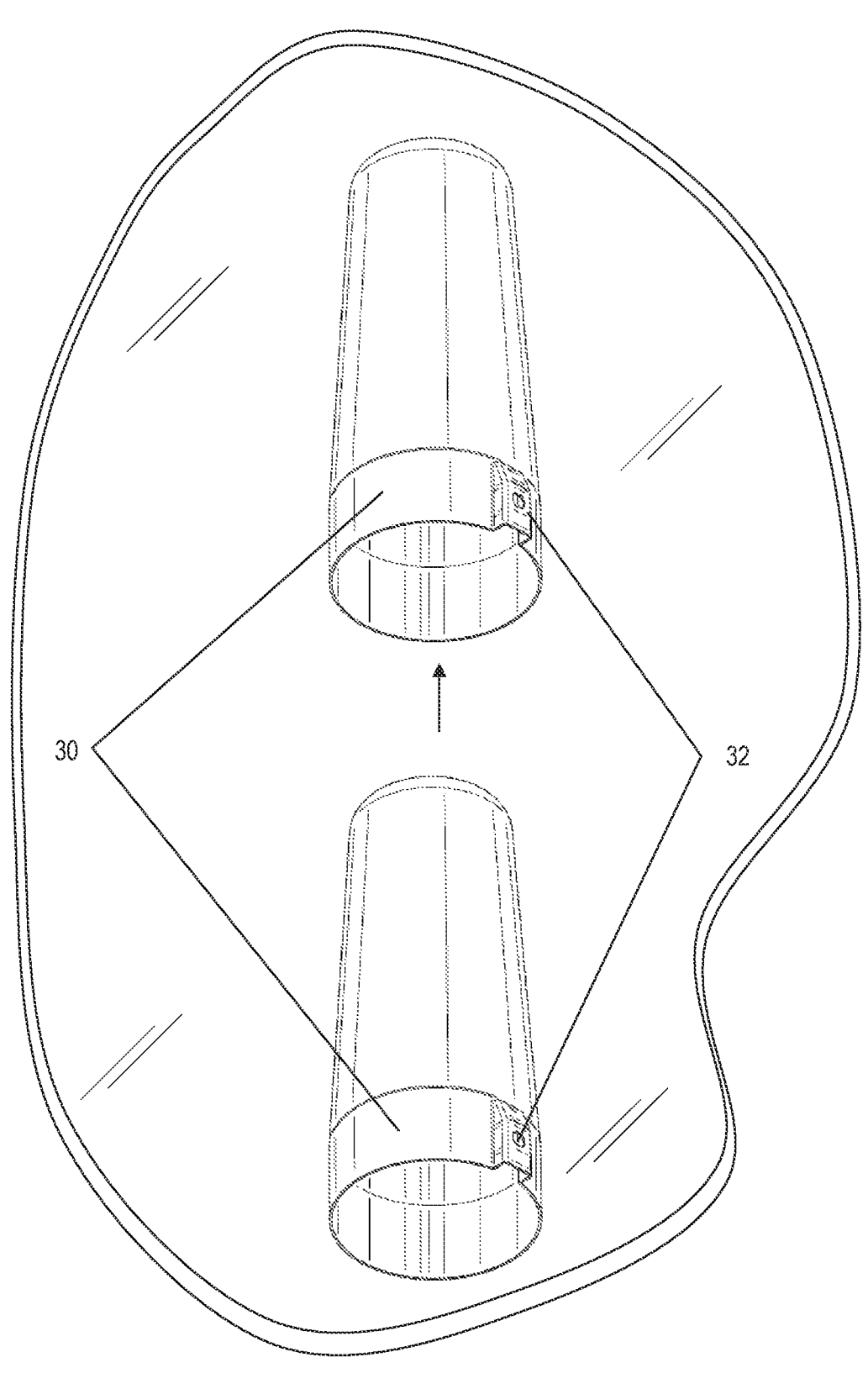
FIG. 4 depicts the second portion of the telecommunication cable enclosure kit as its own telecommunication cable enclosure kit.

Referring next to FIG. 4, a wrapped package including numerous pedestals 30 stacked together in a nested combination as part of the second portion 44 is shown. Again, the present packaging is merely notional and may assume any form suitable for the various aforementioned needs. As with FIG. 3, in the manner presently shown, the individual pedestals 30 that are contained within the second portion 44 of the entire telecommunication cable enclosure kit 40 is isolated from the first portion 42, thereby becoming its own kit. As can be seen, the wrapped package includes a single batch of pedestals 30 taken from a larger as-manufactured group such that the dimensions within the single batch are common (again, by way of example, with one of the eight-, ten- and twelve-inch diameter variants) for ease of nesting and the associated shipping and storing.

As can be seen from FIGS. 2 through 4, each of the telecommunication cable enclosure kits 40 and their corresponding components may be shipped and stored in bulk in such a manner that the volume associated with such shipping or storing is reduced as much as possible while preserving the economy of scale associated with large-quantity manufacturing. In this way, the efficiencies associated with the delivery (such as to an individual end-use residence or the like) of a single telecommunication cable enclosure assembly 10 that results from the joined combination of one base 20 and one pedestal 30 each taken from one or more of the telecommunication cable enclosure kits 40 can be maximized, thereby significantly reducing costs associated with such shipping and storing.

Figure 5:
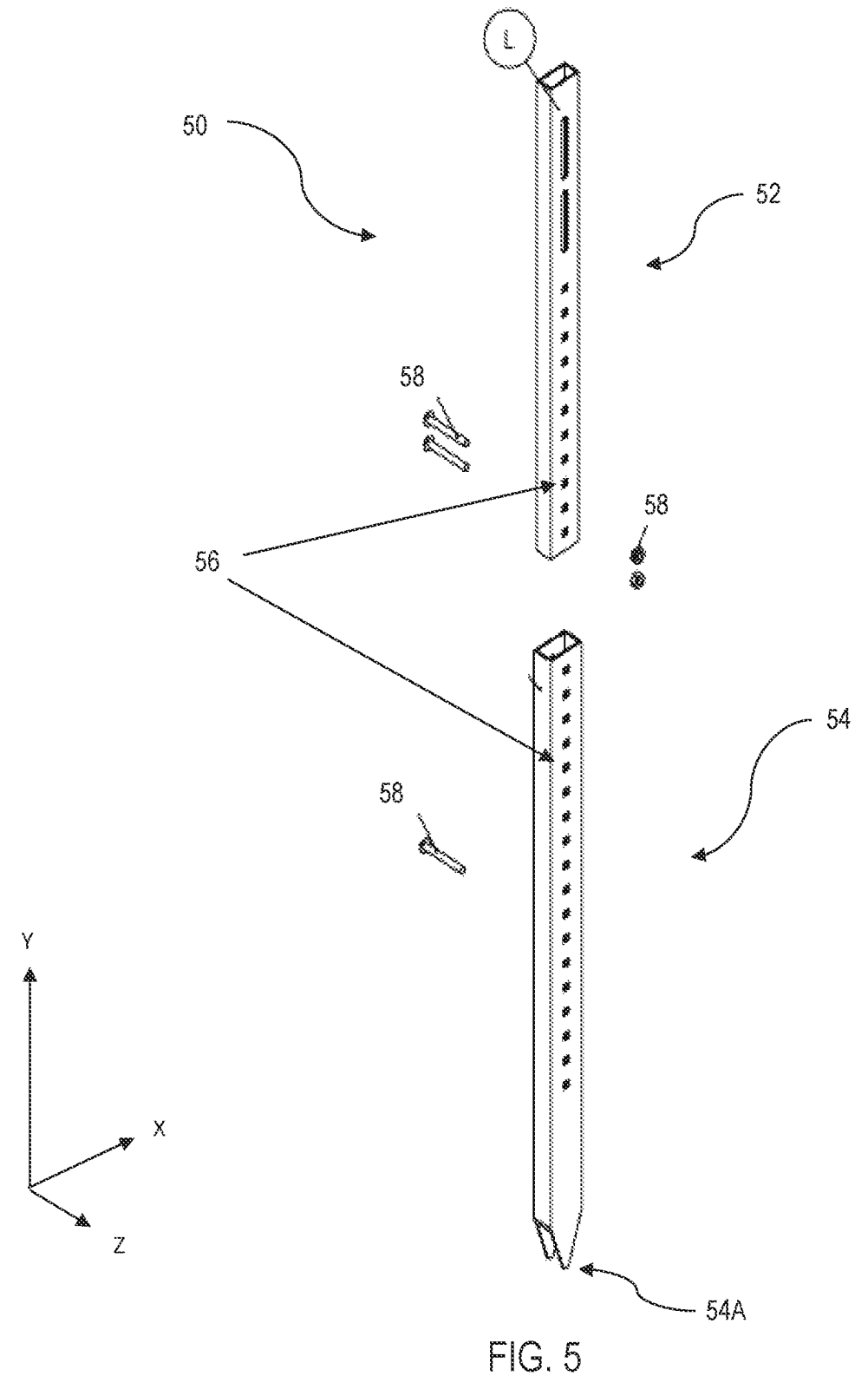
FIG. 5 depicts an optional ground stake that may be used with the telecommunication cable enclosure assembly of FIG. 1.

Referring next to FIG. 5, a ground stake (or more simply, stake) 50 is shown. Its two-piece rigid (for example, metal) construction allows for an inner telescoping portion 52 to assume a smaller cross-sectional profile than an outer telescoping portion 54 so that together they may allow for various lengths of the stake 50 along the vertical dimension associated with the Y-axis. In one form, the outer telescoping portion 54 further includes a pointed lower end 54A for case of securing to the ground. Numerous apertures 56 formed along the elongate axis of both portions 52, 54 may be aligned and secured with fasteners 58 such as screws, rivets, bolts or the like. In addition, these (or other) apertures 56 may be used to promote a fixed attachment to one or both of the base 20 and pedestal 30. As previously noted, mounting structures formed within the inner volume or cavity of the base 20 or pedestal 30 may be made to engage with the stake 50 as a way to affix it to the telecommunication cable enclosure assembly 10. Such affixing may be through fasteners, adhesives, snap-fit connection, slidable friction fit or other known means (including those similar to fasteners 58, as shown). Although not presently shown, it will be appreciated that one or more of the ground stakes 50 may be included as part of the entire telecommunication cable enclosure kit 40 (as well as part of one or both of the first and second portions 42, 44), depending on the needs as previously discussed. Such inclusion may be through either common or separate packaging.

Figure 6:
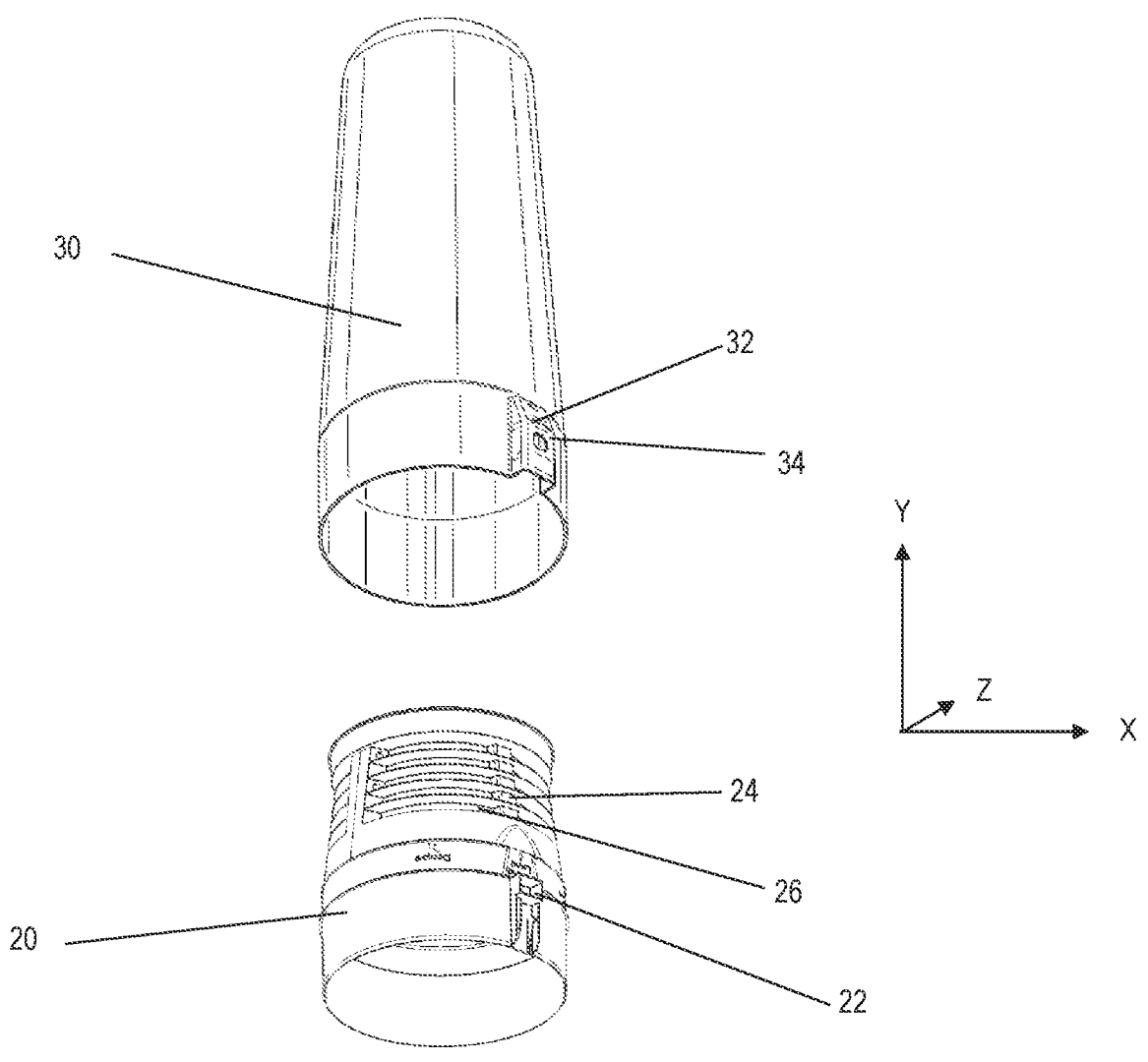
FIG. 6 depicts the base and the pedestal of FIG. 1 in a state of disassembly where the base is inverted about the horizontal axis relative to its assembled position.

Referring next to FIG. 6, the base 20 and pedestal 30 are shown in a disassembled and axially-aligned state where the base 20 has been rotated 180 degrees relative to its position in the as-assembled state of FIG. 1. In this way, the base 20 and pedestal 30 may be nested and separately packaged (possibly along with the ground stake 50 of FIG. 5 and any ancillary components or equipment) for a single end-use. Although such packaging is not the same as the kits depicted in FIGS. 2 through 4 (in that is does not include larger batches of numerous identical parts such as the bases 20 or pedestals 30), it too may be thought of as a kit, specifically an assembly kit to distinguish it from an enclosure kit.

As can be seen with particularity in this view, both of the base 20 and the pedestal 30 define the aforementioned tapered shapes along at least a portion of their most elongate dimensions (that is to say, along the Y-axis) when installed on the ground as the telecommunication cable enclosure assembly 10 of FIG. 1. As previously noted, reinforcing or mounting structure 24 may be included in order to provide enhancements to the moldability, structural rigidity or connectivity of one or both of the base 20 and pedestal 30. For example, the base 20 may include a molded-in mounting surface (not shown) for the optional ground stake 50, while the reinforcing or mounting structure 24 may be in the form of ribs, bars, trusses or the like. Likewise, in one form, a snap-fit locking mechanism may be made from respective parts of the generally axisymmetric base 20 and pedestal 30; such locking mechanism may be formed on one or both of the inner and outer surfaces of both components, as well as through them. As shown, the first part is a tab 22 that extends radially outward on a circumferential lower end of the base 20, while the pedestal 30 includes a detent 32 that extends radially outward on its circumferential lower end. By cooperative sizing and shaping of the tab 22 and detent 32, they can be made to interlock with one another upon the application of a sliding force (such as by a service technician, enclosure installer or the like) along their collinear elongate axis. In one form, the snap-fit functionality enabled by the tab 22 and detent 32 is enabled once the base 20 and pedestal 30 are brought into registration with one another to produce the telecommunication cable enclosure assembly 10 of FIG. 1. In particular, the elastic bias inherent in the snap-fit causes a spring-like snap back between overlapping engageable parts that results in an interference fit that resists unlocking when attempts to move them in an opposite manner along the direction of engagement makes the locking mechanism self-latching. As will be discussed in greater detail in conjunction with FIGS. 8A through 8C, additional locking security may be achieved through supplemental means, such as a separate pedestal lock.

Figure 7:
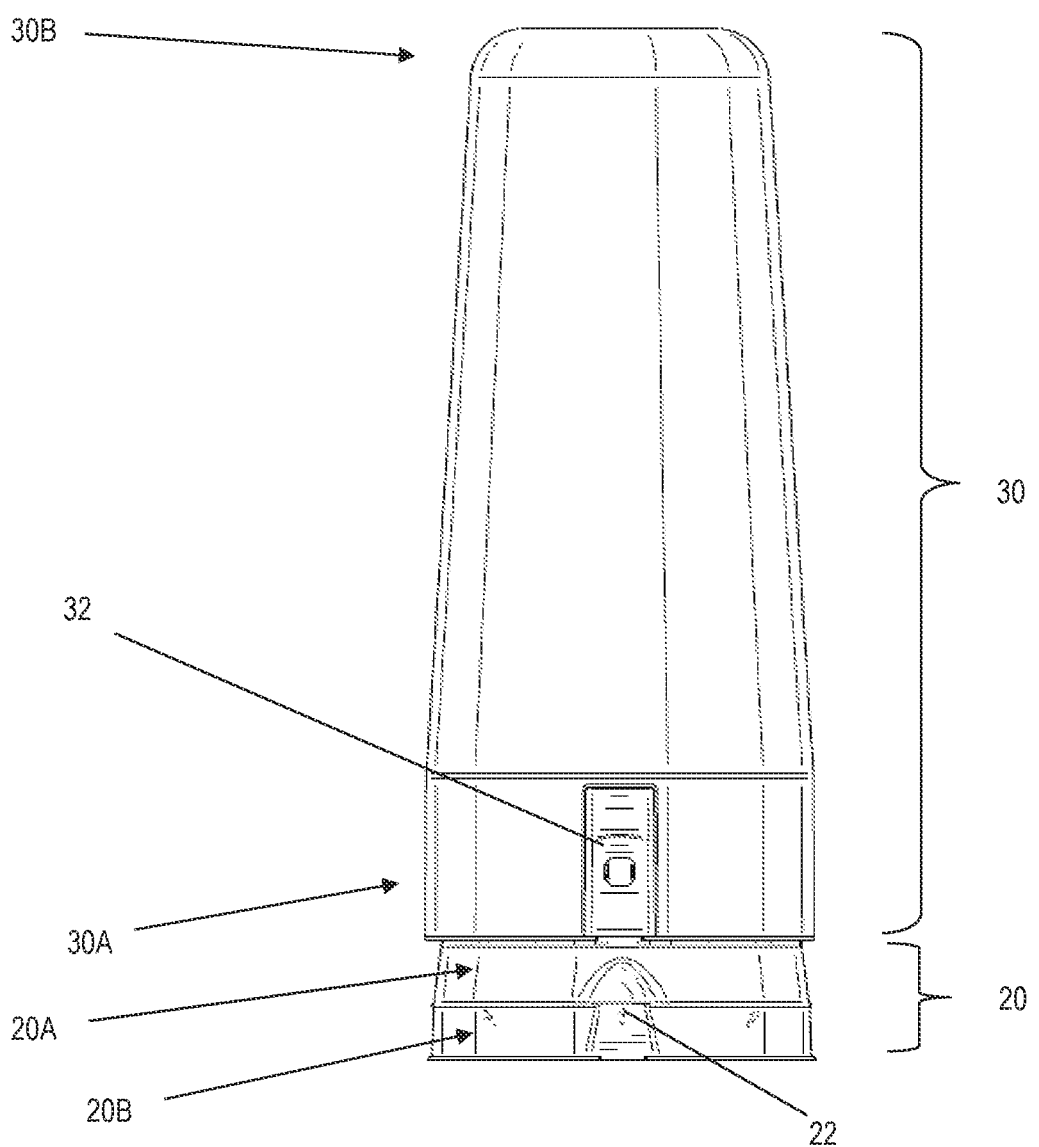
FIG. 7 depicts the base and pedestal of FIG. 6 having been joined together to form a stackable nested combination in a manner analogous to FIGS. 2 through 4.

Referring next to FIG. 7, the base 20 and pedestal 30 of the disassembled and axially-aligned state of FIG. 6 are now shown as being brought together to form a stackable nested combination in a manner analogous to the first and second portions of the telecommunication cable enclosure kit 40 of FIGS. 2 through 4. In a similar manner, the nested combination shown in this figure may be packaged in a manner similar to that shown in FIGS. 2 through 4.

Figure 8A:
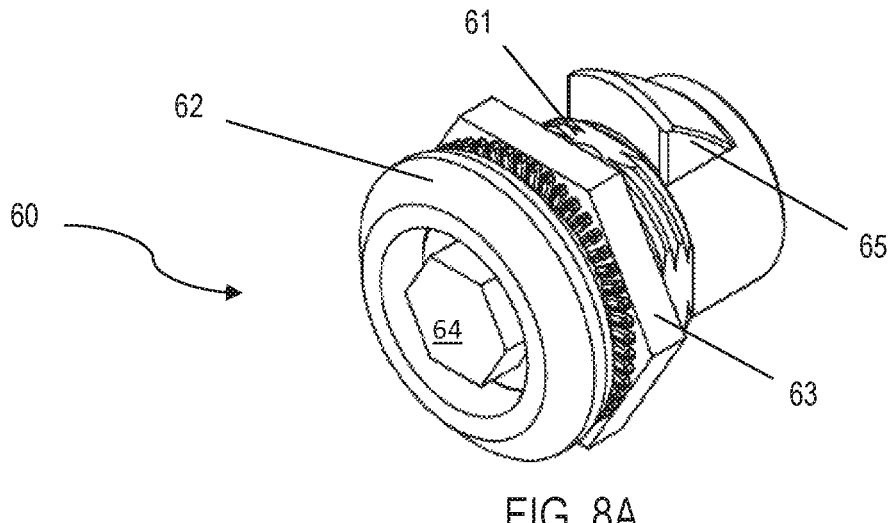
FIGS. 8A through 8C show a locking mechanism that may be used with the telecommunication cable enclosure assembly of FIG. 1.
Figure 8B:
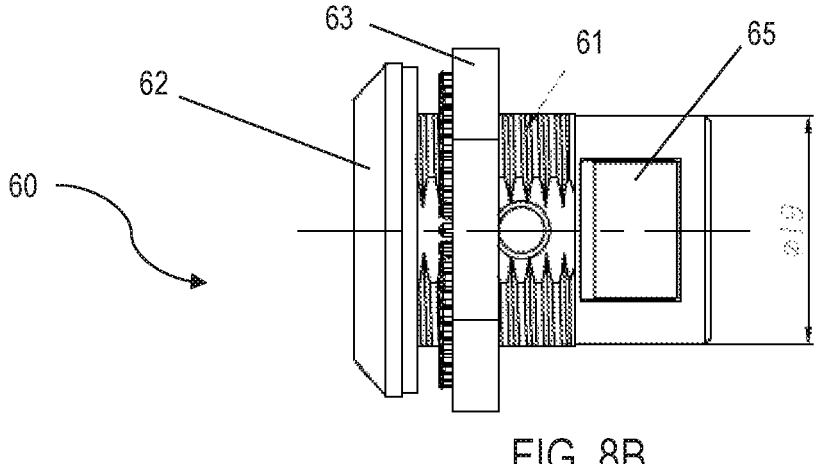
Figure 8C:
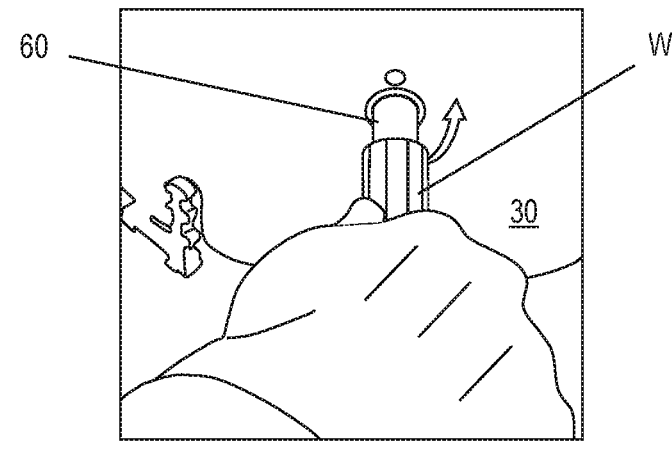

Referring next to FIGS. 8A through 8C, a pedestal lock 60 may be included to provide additional security for the telecommunication cable enclosure assembly 10 of FIG. 1. Referring with particularity to FIGS. 8A and 8B, the pedestal lock 60 is an assembly that defines a screw-like shape that includes a lock body or housing 61 and an exaggerated head or outer surface 62. Upon insertion of the housing 61 into a complementary-sized aperture in the pedestal 30, the outer surface 62 may be seated against an outer surface of the pedestal 30. The pedestal lock 60 is held securely to the pedestal 30 with a nut 63 that upon a tightening engagement with a threaded portion of the lock housing 61, an axial gap between an inward-facing part of the outer surface 62 and an outward-facing part of the nut 63 closes down until they securely clamp down on a portion of the inner surface of the pedestal 30 that is disposed about the aperture. An insert 64 is disposed on a proximal end of the lock housing 61 and extends axially through a central bore that is formed therein and terminates in a bolt 65 that extends radially outward from a substantially distal end of the lock housing 61. The bolt 65 is responsive to rotational movements imparted to the insert 64 by a wrench W or related tool. A slightly recessed placement of the insert 64 within the outer surface 62 provides additional security against inadvertent or unauthorized turning and consequent disengagement of the bolt 65.

As shown with particularity in FIG. 8C, the pedestal lock 60 is formed through the wall of the pedestal 30 such that the lock housing 61 (not presently shown) that is on an inner surface of such wall and the catch housing 64 (not presently shown) that is secured to an outer surface of the base 20 (not presently shown) are—upon engagement of the corresponding nut 63 and bolt 65—in locking registration with one another. As can be seen, the outer surface 62 may be turned through an arc-like pattern through a suitably-configured tool such as a hex-shaped wrench W to cause such registration between the nut 63 and bolt 65.

As previously noted, the pedestal lock 60 may be used in addition to or in lieu of a snap-fit locking mechanism that may be formed by the tab 22 and detent 32. In another form (not shown), placement of the pedestal lock 60 and the snap-fit locking mechanism may be in different parts of the pedestal 30 from one another, and that all such variants of number and placement of these and other locking features are deemed to be within the scope of the present disclosure.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Within the present disclosure, one or more of the following claims may utilize the term "wherein" as a transitional phrase. For the purposes of defining features discussed in the present disclosure, this term is introduced in the claims as an open-ended transitional phrase that is used to introduce a recitation of a series of characteristics of the structure and should be interpreted in like manner as the more commonly used open-ended preamble term "comprising."

Within the present disclosure, terms such as "preferably", "generally" and "typically" are not utilized to limit the scope of the claims or to imply that certain features are critical, essential, or even important to the disclosed structures or functions. Rather, these terms are merely intended to highlight alternative or additional features that may or may not be utilized in a particular embodiment of the disclosed subject matter. Likewise, it is noted that the terms "substantially" and "approximately" and their variants are utilized to represent the inherent degree of uncertainty that may be attributed to any quantitative comparison, value, measurement or other representation. As such, use of these terms represents the degree by which a quantitative representation may vary from a stated reference without resulting in a change in the basic function of the subject matter at issue.

Within the present disclosure, the use of the prepositional phrase "at least one of" is deemed to be an open-ended expression that has both conjunctive and disjunctive attributes. For example, a claim that states "at least one of A, B and C" (where A, B and C are definite or indefinite articles that are the referents of the prepositional phrase) means A alone, B alone, C alone, A and B together, A and C together, B and C together, or A, B and C together. By way of example within the present context, if a claim recites that data is being acquired from at least one of a first wireless communication sub-module and a second wireless communication sub-module, and if such data is being acquired from the first wireless communication sub-module alone, the second wireless communication sub-module alone or both of the first and second wireless communication sub-modules, then such data acquisition satisfies the claim.

Within the present disclosure, the following claims are not written in means-plus-function format and are not intended to be interpreted based on 35 USC 112(f) unless and until such claim limitations expressly use the phrase "means for" followed by a statement of function void of further structure.

What is claimed is:

1. An enclosure kit for telecommunication cable, the enclosure kit comprising:

a plurality of bases each defining a tapered hollow shape about an axis that extends along a base height-wise dimension, wherein each base further defines a tab formed on a radially outward-extending surface thereof; and a plurality of pedestals each defining a tapered hollow shape about an axis that extends along a pedestal height-wise dimension, wherein each pedestal further defines a detent formed on a cooperating surface thereof each base and respective pedestal are formable into an assembly along their respective height-wise dimensions through slidably collinear cooperative engagement with one another through the tab and detent that engage to form a locking mechanism to prevent relative rotation about the collinear axis, wherein prior to forming the assembly, the plurality of bases and the plurality of pedestals each form a respective portion of the enclosure kit through a nested combination with a plurality of other identical bases and pedestals.

2. The enclosure kit of claim 1, wherein the detent defines an aperture formed in a radially outward-extending surface thereof, the aperture configured to accept a fastener therethrough.

3. The enclosure kit of claim 1, wherein the locking mechanism is self-latching upon application of a snap-fit force applied between the pedestal and the base along the collinear axis.

4. The enclosure kit of claim 1, further comprising a ground stake configured to be fixedly cooperative with an inner surface of at least one of the base and the pedestal.

5. The enclosure kit of claim 1, further comprising a telecommunication cable mounting plate cooperative with at least one inward-projecting mounting surface that is formed on an interior of the tapered hollow shape of the pedestal.

6. The enclosure kit of claim 1, wherein the base defines a plurality of rigidity-enhancing ribs formed therein.

7. The enclosure kit of claim 1, wherein the base and pedestal are made from a fire-resistant material.

8. The enclosure kit of claim 1, whereupon formation of the assembly, it defines a watertight structure.

9. The enclosure kit of claim 1, wherein the base and the pedestal define a substantially rectangular profile.

10. The enclosure kit of claim 1, wherein the base and the pedestal define a substantially cylindrical profile such that the collinear axis defines an axis of rotation.

11. The enclosure kit of claim 10, wherein at least a portion of the height-wise dimension of each of the base and the pedestal define the tapered hollow shape as a truncated cone.

12. The enclosure kit of claim 1, further comprising a pedestal lock comprising:

a lock housing configured to be secured to a corresponding one of the plurality of pedestals;

a rotatable lock with a spring latch rigidly secured thereto such that the rotatable lock is exposed to an outer surface of the pedestal while the spring latch is exposed to an inner surface of the pedestal;

a catch housing configured to be secured to a corresponding one of the plurality of bases; and a catch rigidly secured to the catch housing such that the catch is exposed to an inner surface of the pedestal such that upon formation of the assembly, the pedestal lock is selectively engageable to lock the corresponding one of the plurality of bases to the corresponding one of the plurality of pedestals through an interference fit formed between the spring latch and the catch.

13. The enclosure kit of claim 1, wherein the enclosure kit comprises a first portion and a second portion such that the first portion contains a nested combination of the plurality of bases each substantially identical to one another and the second portion contains a nested combination of the plurality pedestals each substantially identical to one another.

14. An enclosure assembly for telecommunication cable that is formed from one base and one pedestal of an enclosure kit that contains a nested combination of a plurality of other identical bases and a nested combination of a plurality of other identical pedestals, the enclosure assembly comprising the base and the pedestal wherein:

the base defines a tapered hollow shape about a first axis that extends along a height-wise dimension thereof, wherein the base further defines a tab formed on a radially outward-extending surface thereof; and the pedestal defines a tapered hollow shape about a second axis that extends along a height-wise dimension thereof, wherein the pedestal further defines a detent formed on a cooperating surface thereof, wherein a size and shape that defines the identical bases of the enclosure kit and a size and shape that defines the identical pedestals of the enclosure kit are configured such that upon removal of the base and the pedestal from the enclosure kit they are formable into the enclosure assembly along their respective height-wise dimensions through collinear cooperative engagement with one another, such that slidable engagement between the tab and the detent form a locking mechanism to prevent relative rotation between the base and the pedestal about the collinear axis.

15. The enclosure assembly of claim 14, further comprising a ground stake cooperative with at least one of the base and the pedestal.

\* \* \* \* \*